United States Patent [19]

Salour et al.

[11] Patent Number: 4,639,075
[45] Date of Patent: Jan. 27, 1987

[54] DISTORTION FREE FIBER OPTIC SYSTEM

[75] Inventors: Michael M. Salour, Cambridge, Mass.; Gustav W. Fehrenbach, Essen, Fed. Rep. of Germany

[73] Assignee: The United States of America as represented by the Secretary of the Air Force, Washington, D.C.

[21] Appl. No.: 497,443

[22] Filed: May 23, 1983

[51] Int. Cl.$^4$ .............................. G02B 6/28; G02F 1/00
[52] U.S. Cl. .............................. 350/96.16; 350/96.10; 350/96.15; 350/96.17; 350/96.29; 455/600; 455/608; 455/609; 455/610; 331/107 R; 307/424
[58] Field of Search ............... 350/96.10, 96.15, 96.16, 350/96.17, 96.20, 96.21, 96.29, 96.30; 250/227; 455/600, 605, 606, 608, 609, 610, 612, 620; 331/66, 65, 73, 94.1, 107 S, 172, 107 R; 307/424, 425, 426, 427, 430; 357/16, 17

[56] References Cited

U.S. PATENT DOCUMENTS

| | | | |
|---|---|---|---|
| 3,368,161 | 2/1968 | Hensel | 331/94.1 |
| 3,694,753 | 9/1972 | Arndt | 455/600 |
| 3,697,757 | 10/1972 | Stone | 455/608 |
| 3,792,379 | 2/1974 | Auston et al. | 455/608 |
| 3,852,591 | 12/1974 | Lee et al. | 350/96.1 |
| 4,089,586 | 5/1978 | French et al. | 350/96.30 |
| 4,143,940 | 3/1979 | Khoe | 350/96.15 |
| 4,205,900 | 6/1980 | Eve | 350/96.31 |
| 4,228,349 | 10/1980 | Ettenberg et al. | 455/612 |
| 4,261,639 | 4/1981 | Kogelnik et al. | 350/96.15 |
| 4,300,930 | 11/1981 | Chang | 65/3.11 |
| 4,528,464 | 7/1985 | Chemla et al. | 357/17 |

OTHER PUBLICATIONS

Miller et al., "Room Temperature Saturation Characteristics...", Applied Physics B 12th Int. Quant. Elect. Conf., vol. B28, No. 2/3, pp. 96-97.
Miller et al., "Large Room Temperature Optical Nonlinearity...", Applied Physics Lett., vol. 41, No. 8, 10/82, pp. 679-681.
Kittel et al., "Introduction to Solid State Physics", John Wiley and Sons, 5th Ed., pp. 302-317 and 332-351.
Hartwig, "Superconducting Resonators and Devices", Pro. of the IEEE, vol. 61, No. 1, 1/73, pp. 58-70.
Fehrenbach, G. W. & Salour, Michael M., "Polariton-Induced Compensation of Pulse Broadening in Optical Fibers," Applied Physics Letters, vol. 41, No. 1, Jul. 1, 1982, pp. 4-6.
Nakatsuka, Hiroki & Grischkowsky, D., "Recompression of Optical Pulses Broadened by Passage Through Optical Fibers," Optics Letters, vol. 6, No. 1, Jan. 1981, pp. 13-15.
Ulbrich, R. G. & Fehrenbach, G. W., "Polariton Wave Packet Propagation in the Exciton Resonance of a Semiconductor," Physical Review Letters, vol. 43, No. 13, Sep. 24, 1979, pp. 963-966.

Primary Examiner—William L. Sikes
Assistant Examiner—Brian M. Healy
Attorney, Agent, or Firm—Jacob N. Erlich; Donald J. Singer

[57] ABSTRACT

A distortion free fiber optic system having a single-mode optical fiber utilized in combination with a semiconductor material mounted in optical alignment therewith. Although it is preferable for the semiconductor material to be adjacent the input end of the fiber, it may, in the alternative, be placed adjacent the output end of the fiber. For appropriate distortion free propagation of a beam of electromagnetic radiation through the optical fiber, the semiconductor material must be receptive to the wavelength of the electromagnetic beam. This can be accomplished by either matching the semiconductor material to the wavelength of the beam or tuning the source of the electromagnetic beam to the excitonic-polariton resonance of the semiconductor crystal.

18 Claims, 7 Drawing Figures

DISTORTION FREE FIBER OPTIC SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to fiber optic systems and, more particularly, to a distortion compensated fiber optic system and a method for accomplishing substantially distortion free electromagnetic radiation transmission through an optical fiber.

Optical fibers that act in the capacity of "light pipes" have been available for a number of years, finding utility in a variety of ways such as in medical instruments, photocopying machines, and air plane, space shuttle, automobile instrument panels, etc. The potential of large bandwidth and small size in optical fibers has, in recent years, led to the feasibility of optical communication systems. In fact, during the past few years the use of optical fibers has grown mainly because of their potential application as transmission media in long-distance, high-bit-rate optical communication systems. With the advent of the single-mode optical fiber, that is, a fiber which is capable of eliminating the propagation of all but one electromagnetic mode, the use of optical fibers (and especially single-mode optical fibers) has increased.

Recently, considerable attention has been given to the study of pulse distortions in single-mode optical fibers where the maximum data rate of signal transmission is limited by the group velocity dispersion (GVD). Distortion-free pulse propagation has been demonstrated in fused silica fibers at 1.3 μm and in the 1.3–1.7 μm spectral region, where the GVD of a single fiber or a combination of two fibers, respectively, vanishes. Unfortunately, in spectral regions other than the 1.3–1.7 μm region set forth above, transmission through such single-mode optical fibers is subject to substantial distortion. It would therefore be highly desirable to expand the wavelength region of distortion-free pulse propagation towards shorter wavelengths (visible, in particular) where the group velocity dispersion is particularly large.

Recent work in this area, as exemplified by H. Nakatsuka and D. Grischkowsky, *Opt. Lett.*, Vol. 6, January 1981, pgs 13-15, has provided evidence that the use of an atomic-sodium vapor delay line can cause the recompression of light pulses broadened by passage through optical fibers. Although this type of optical fiber system has increased the effective spectral range of optical fibers associated with gaseous systems, its general use is severely limited. For example, as a result of its considerable bulkiness, complexity and sensitivity to surrounding conditions such optical systems are unable to be easily transported or be used in the field. Therefore, there still exists a substantial need for reliable and effective distortion compensated fiber optic systems.

SUMMARY OF THE INVENTION

The present invention overcomes the problems encountered in the past and as set forth in detail hereinabove by providing a distortion free fiber optic system which is not only rugged and simple in construction, but which is also highly effective in substantially eliminating distortion incurred by an electromagnetic beam as it passes through an optical fiber.

The system of the present invention is made up of an optical fiber, preferably a single-mode optical fiber, used in combination with a semiconductor material, preferably in the form of a GaAs crystal, mounted in optical alignment with the optical fiber. The semiconductor crystal is supported in a temperature controlled environment of approximately 8° K., obtained by pumping liquid helium into a housing in which the semiconductor crystal is maintained. In addition, the semiconductor crystal is supported within the housing for movement into and out of optical alignment with the optical fiber.

It is preferable with the optical system of the present invention that the semiconductor crystal be mounted adjacent the input end of the optical fiber. By so doing, non-linear effects in the semiconductor crystal caused by saturation of the exciton-polariton resonance can be avoided. It should, however, be realized that the semiconductor crystal can also be located adjacent the output end of the optical fiber as well, although optimum benefits may be lessened by such an arrangement. With the crystal placed in front of the optical fiber higher output power of the combined transmission line for the same critical power limit in the optical fiber can result.

For optimum distortion compensation, it is essential that the semiconductor crystal be receptive to the wavelength of the incoming beam of electromagnetic radiation. This can be accomplished by either providing a semiconductor crystal matched to the wavelength of the incoming electromagnetic beam, or since this incoming beam of electromagnetic radiation is generally provided by a conventional dye laser, the dye laser source can be properly tuned to the excitonic-polariton resonance of the semiconductor crystal. Stated more succinctly, for distortion free propagation to take place within the optical fiber, the following criteria must be established:

$$\frac{d^i}{d\lambda^i} n = 0$$

where $i \geq 2$; and $i =$ an integer, $\lambda =$ wavelength of incoming beam of electromagnetic radiation, and $n =$ index of refraction of the semiconductor crystal or optical fiber.

By the utilization of the distortion compensated fiber optic system of the present invention a new technique is provided for achieving substantially distortion free pulse propagation through an optical fiber at essentially any wavelength. In addition, a conventional autocorrelator can be utilized within the fiber optic system of this invention in order to provide information with respect to a comparison between the input beam and output beam. This comparison is extremely helpful in maintaining distortion free pulse propagation as the input beam of electromagnetic radiation passes through the optical fiber.

It is therefore an object of this invention to provide a distortion free fiber optic system.

It is a further object of this invention to provide a method for compensating for the distortion of an electromagnetic beam as it passes through an optical fiber.

It is another object of this invention to provide a distortion free fiber optic system which is highly reliable in operation.

It is still a further object of this invention to provide a distortion free fiber optic system which is capable of use in the field and is extremely rugged and dependable.

It is still another object of this invention to provide a distortion free fiber optic system which eliminates the complexities involved in past systems.

It is even still a further object of this invention to provide a distortion free fiber optic system which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
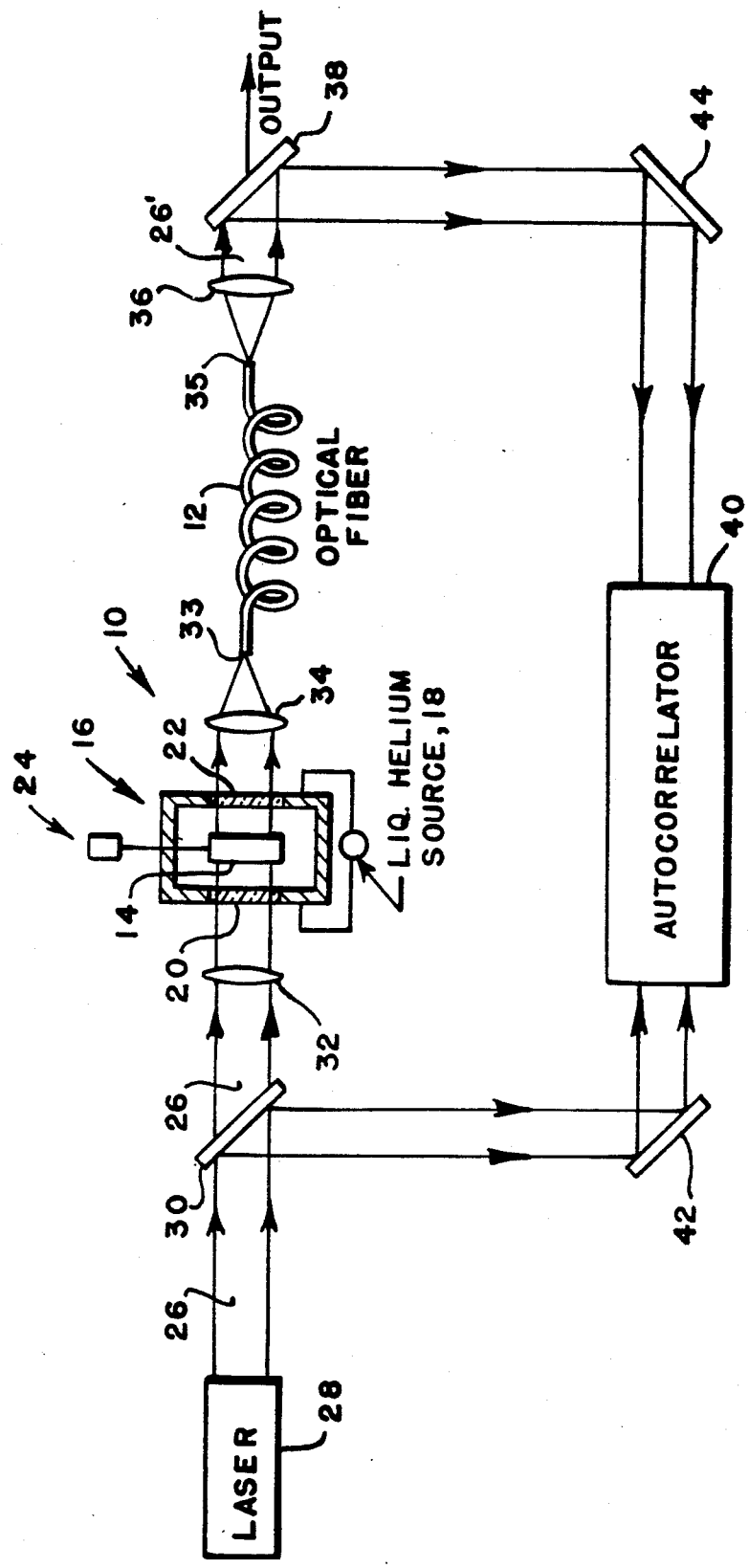
FIG. 1 is schematic representation of the distortion free fiber optic system of this invention.

Reference is now made to FIG. 1 of the drawing which schematically illustrates the distortion free fiber optic system 10 of the present invention. The distortion free fiber optic system 10 is made up of two main components, an optical fiber 12 and a semiconductor material 14.

More specifically, system 10 incorporates therein any conventional optical fiber 12, but preferably a single-mode optical fiber. A single mode optical fiber is utilized with the present invention since it is capable of eliminating the propagation of all but one electromagnetic mode as a beam of electromagnetic radiation passes therethrough. In the past, and as discussed hereinabove, pulse propagation through an optical fiber was subject to distortion except when the electromagentic radiation passing therethrough fell between the 1.3–1.7 $\mu$m spectral region.

In order to eliminate this type of distortion the present invention also includes in optical alignment with optical fiber 12 a semiconductor material. Although any number of semiconductor materials may be used with this invention, a typical example of one such semiconductor material would be a GaAs crystal 14. The semiconductor crystal 14 can vary in its size, however, a preferred controlled thickness of 6.3 $\mu$m and approximately $1 \times 1$ mm$^2$ surface area is desirable. The crystal can be prepared from a high-purity ($N_D$, $N_A \approx 5 \times 10^{14}$ cm$^{-3}$) liquid-phase epitaxy material by standard lapping and etching techniques.

For appropriate operation of the distortion free fiber optic system 10, semiconductor crystal 14 is supported within a housing 16 capable of maintaining crystal 14 in a cooled environment of approximately 8° K. This can be accomplished, for example, by pumping liquid helium from any suitable liquid helium source 18 through housing 16. Additionally, housing 16 contains oppositely disposed windows 20 and 22 which are transparent to the wavelength of a beam 20 of electromagnetic radiation which is to pass through crystal 14 and optical fiber 12. Any conventional supporting system 24 can be utilized to maintain semiconductor crystal 14 in its appropriate position within the optical path of beam 26 of electromagnetic radiation which passes therethrough as well as through optical fiber 12. It should be noted, however, that supporting system 24 should also be capable of moving crystal 14 both into and out of the optical path of beam 26 for reasons set forth hereinbelow. Such movement of crystal 14 can be accomplished in any conventional manner.

Examples of semiconductors which can be utilized within the present invention and which exhibit excitonic-polariton resonance at room temperature and therefore do not require the use of cryogenic housing 16 are more commonly referred to as Multiple Quantum Well (MQW) semiconductors. Such semiconductors are described in greater detail in the following articles: Miller et al, "Room-temperature Saturation Characteristics of GaAs-GaAlAs Multiple Quantum Well Structures of Bulk GaAs," *Applied Physics*, Vol. B28, pp 96–97, 1982 and Miller et al, "Large room-temperature optical non-linearity in GaAs/Ga$_{1-x}$Al$_x$As multiple quantum well structures," *Applied Physics Letters*, Vol. 41, pp 679–681, 1982.

The beam 26 of electromagnetic radiation which is to remain distortion free by the use of system 10 of this invention can be produced by any conventional electromagentic radiation source such as, for example, a synchronized mode-locked oxazine-750 dye laser 28. Optically interposed between laser 28 and semiconductor crystal 14 is a conventional beam splitter 30 utilized in a manner described hereinbelow, and a focusing lens 32. Optically interposed between semiconductor crystal 14 and the input end 33 of optical fiber 12 is any conventional optical coupling device such as, for example, a coupling lens 34. As pointed out hereinabove, fiber 12 is preferably a single-mode fiber such as, for example, a 100-m single-mode optical fiber having a core diameter of 4 m of the type manufactured by ITT as T-1601.

Optically aligned with the output end 35 of optical fiber 12 is a collimating lens 36 which enables beam 26' which outputs from fiber 12 to be directed either through conventional beam splitter 38 as an output beam of electromagnetic radiation or to be directed by beam splitter 38 into a conventional autocorrelator 40 for use in the manner set forth in detail hereinbelow. Corner reflectors 42 and 44 may be utilized in order to direct a portion of incoming electromagnetic radiation beam 26 and outgoing beam 26', respectively, into opposite ends of optical correlator 40.

It should be realized that autocorrelator 40 and its associated reflective elements 42 and 44 and beam splitters 30 and 38 are utilized with the present invention to form a complete system in which it is possible to compare the input beam 26 with the output beam 26'. Although these elements are extremely important in making a comparison of input and output beams 26 and 26', they may be omitted in certain circumstances without actually affecting the operation of the distortion free fiber optic system 10 of the present invention.

Figure 2:
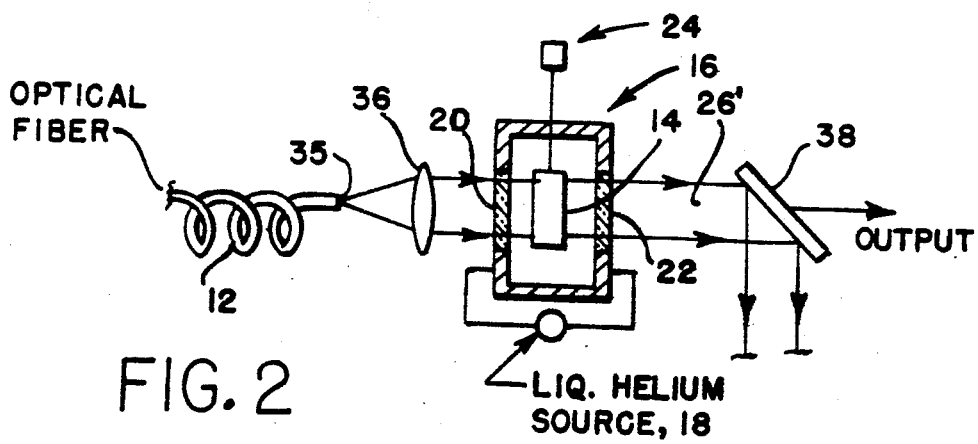
FIG. 2 is a schematic representation of an alternate positioning of the semiconductor crystal within the distortion free fiber optic system of this invention.

It is also possible, although not preferable, within the scope of this invention to vary the location of semiconductor crystal 14 from its position as shown in FIG. 1, interposed between the electromagnetic radiation source or laser 28 and the input end 33 of optical fiber 12, to a position situated adjacent the output end 35 of optical fiber 12 as illustrated in FIG. 2 of the drawing. Since all of the components of system 10 are identical in FIGS. 1 and 2 of the drawing except for the location of semiconductor crystal 14 and its associated components such as housing 16, all reference numerals utilized in FIG. 2 are identical to those in FIG. 1. For simplicity, only that portion of distortion free fiber optic system 10 which involves the placement of semiconductor crystal 14 is illustrated in FIG. 2.

In either case set forth hereinabove, in order for the distortion free fiber optic system 10 of the present invention to provide such distortion free propagation, it is essential that the semiconductor crystal 14 be receptive to the wavelength of the incoming beam of electromagnetic radiation 26. This can be accomplished by either providing a semiconductor crystal 14 matched to the wavelength of the incoming electromagnetic beam 26, or by properly tuning the source of electromagnetic radiation, laser 28, to the excitonic-polariton resonance of semiconductor crystal 14. By providing semiconductor crystal 14 in optical alignment with optical fiber 12 either before or after optical fiber 12 as illustrated in FIGS. 1 and 2, respectively, any distortion taking place as the beam of electromagnetic radiation 26 passes through optical fiber 12 is substantially eliminated.

This type of operation can be better understood by referring to the following series of equations in which the dispersion of distortion, D, is defined by the following general equation:

$$D = -\frac{\lambda}{c} \frac{d^2 n}{d\lambda^2}$$

where
$\lambda$ = wavelength,
c = speed of light, and
n = index of refraction.

By representing semiconductor crystal 14 with the terms $D_1$, $L_1$, and $n_1$ and optical fiber 12 with the terms $D_2$, $L_2$, and $n_2$ ($D_1$ = the dispersion or distortion through crystal 14, $L_1$ = the length of crystal 14, and $n_1$ = the index of refraction of crystal 14; and $D_2$ = the dispersion or distortion through fiber 12, $L_2$ = the length of fiber 12, and $n_2$ = the index of refraction of fiber 12) distortion free propagation takes place when $$D_1 L_1 + D_2 L_2 = 0;$$

since $D_1 = -\frac{\lambda}{c} \frac{d^2 n_1}{d\lambda^2}$ and $D_2 = -\frac{\lambda}{c} \frac{d^2 n_2}{d\lambda^2}$;

then $-\frac{\lambda}{c} \left( L_1 \frac{d^2 n_1}{d\lambda^2} + L_2 \frac{d^2 n_2}{d\lambda^2} \right) = 0;$ and therefore $\sum_i L_i \frac{d^2 n_i}{d\lambda^2} = 0$ or stated more succinctly, distortion free propagation occurs when $$\frac{d^i}{d\lambda^i} n = 0, \text{ and } i \geq 2$$

where i represents an integer.

In order to further clarify the concepts involved with the present invention the following description will provide an operative example of how, in fact, distortion through an optical fiber can be substantially eliminated by the use of the present invention.

Figure 3:
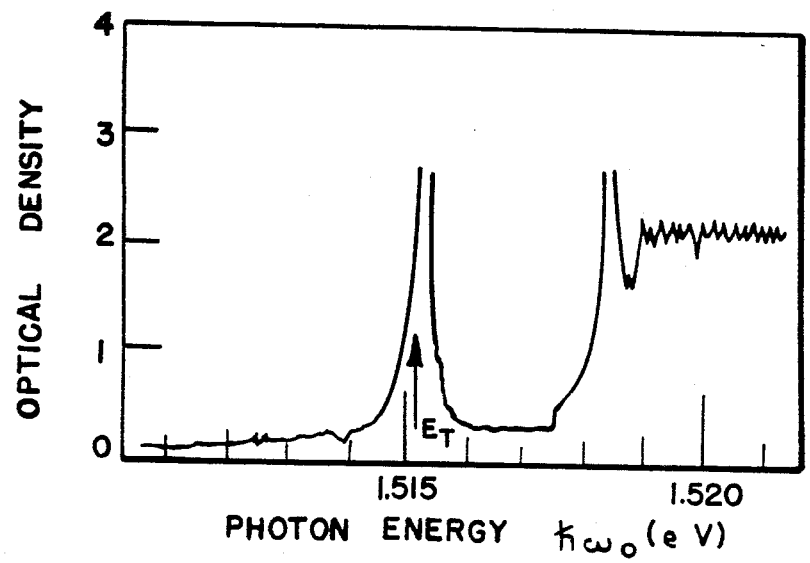
FIG. 3 is a graph representative of the optical density spectrum of a semiconductor crystal in the region of discrete exciton-polariton resonances.
Figure 4:
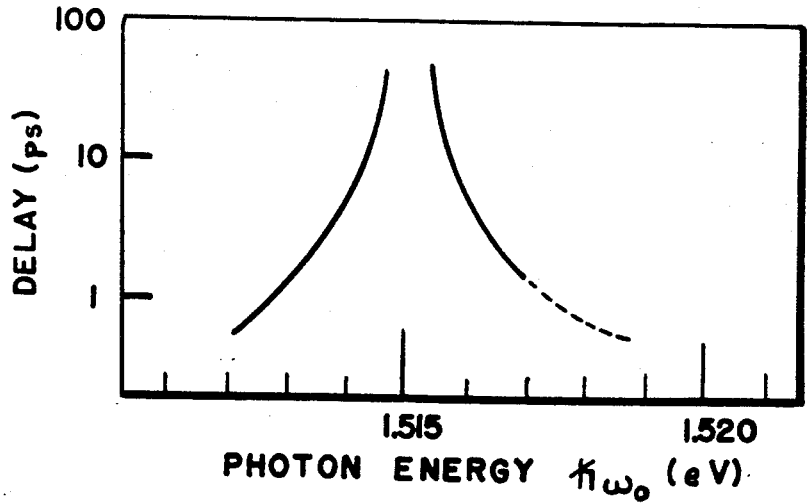
FIG. 4 is a graph representative of temporal delay in a semiconductor crystal.

The coulomb interaction of electron-hole pairs in semiconductors causes discrete exciton resonances. Their coupling to an electromagnetic field leads to the concept of the polariton, a mixed exciton-photon state. In a cw absorption spectrum of the GaAs semiconductor crystal 14, taken with broadband excitation and 0.1-meV resolution, FIG. 3 shows that the exciton-polariton resonances n=1 and n=2 (n=excitonic Rydberg quantum states) are well resolved. The energetic position of the transverse exciton, $E_T = 1.5151$ eV, is also shown in this Figure. FIG. 4 shows the example of delay near the n=1 exciton-polariton resonance in a single-exciton, using the values $E_T = 1.5151$ eV, $E_{LT} = 0.08$ meV (longitudinal-transverse splitting), $M_{ex}^h = 0.6$ $m_o$ (heavy exciton mass), and $\epsilon_b = 12.6$ (background dielectric constant), all known from prior resonant Brillouin scattering experiments. The temporal delay for pulse propagation on the exciton-like lower polariton branch for energies $\hbar \omega_o E_T + E_{LT}$ has been omitted because its contribution to the energy transport is negligible. The dashed line in FIG. 4 indicates that, in the corresponding energy region, the influence the n=2 exciton polariton can no longer be neglected.

Figure 5A:
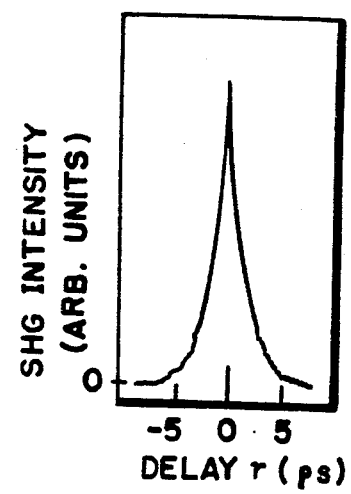
FIGS. 5a-c display intensity-autocorrelation pulse width measurements obtained with the fiber optic system of this invention.
Figure 5B:
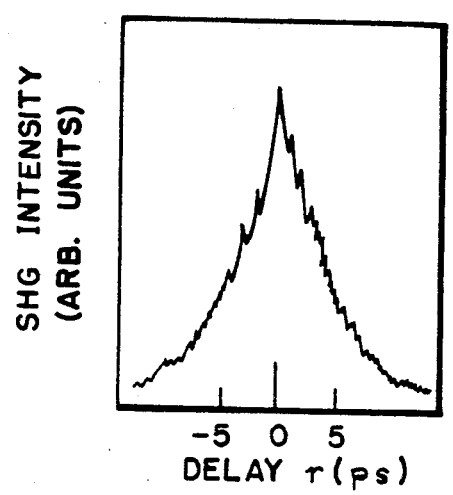
Figure 5C:
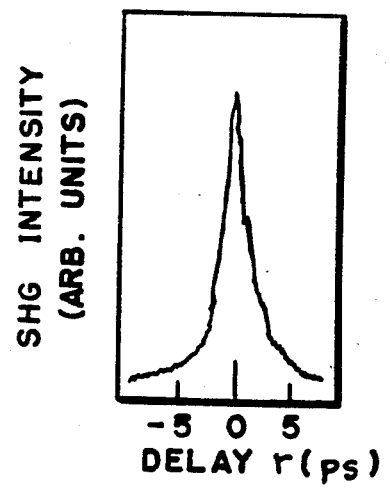

The distortion-free propagation of electromagnetic pulses through optical fiber 12 is demonstrated graphically in FIGS. 5a-c of the drawing. The pulse shapes illustrated in these Figures can be substantiated by conventional autocorrelation techniques utilizing autocorrelator 40 as shown in FIG. 1.

Stated more succinctly, semiconductor crystal 14 has an anomolous dispersion region and beam 26 emanating from laser 28 is tuned to this anomolous dispersion region such that the dispersion through semiconductor crystal 14 counterbalances the dispersion through optical fiber 12.

Initially distortion-free light pulses are provided by laser 28. FIG. 5a, for example, shows the intensity autocorrelation traces of electromagnetic pulses generated by laser 28 prior to entering optical fiber 12. FIG. 5b, on the other hand, illustrates broadened pulses of beam 26' emerging from end 35 of optical fiber 12 with semiconductor crystal 14 removed from the optical path of beam 26.

By reinserting semiconductor crystal 14 back into the optical path of beam 26, essentially distortion-free transmission in optical fiber 12 is accomplished. The pulses of this substantially distortion free output beam 26' are clearly illustrated in FIG. 5c of the drawing.

The present invention provides a new system and technique for achieving distortion free pulse propagation through optical fibers at essentially any wavelength including those at which optical fibers have a large positive GVD. It marks the first use of the anomalous dispersion near a discrete resonance in a solid to counterbalance the pulse broadening in optical fibers. By combining a single-mode optical fiber 12 and any direct-gap semiconductor crystal 14, system 10 of this invention can provide a useful tool for distortion-free pulse propagation in optical fibers at any wavelength.

Although this invention has been described with reference to particular embodiments, it will be understood that this invention is also capable of further and other embodiments within the spirit and scope of the appended claims.

We claim:

1. A distortion free optical fiber system comprising:
   means for providing a beam of electromagnetic radiation, said beam of electromagnetic radiation being at a preselected wavelength;
   an optical fiber optically aligned with said beam of electromagnetic radiation for passing said beam of electromagnetic radiation therethrough, said optical fiber having a first end and a second end;
   compensator means positioned adjacent one of said ends of said optical fiber for receiving and passing therethrough said beam of electromagnetic radiation and for compensating for any distortion which may be incurred by said electromagnetic beam of radiation as said beam passes through said optical fiber, said compensator means including a semiconductor material having a predetermined excitonic-polariton resonance and a corresponding anomolous dispersion region; and
   said preselected wavelength of said beam of electromagnetic radiation being tuned to said predetermined excitonic-polariton resonance and to said anomolous dispersion region of said semiconductor material such that dispersion through said semiconductor material counterbalances dispersion through said optical fiber, and wherein distortion free propagation within said fiber takes place when the following criteria is established:

$$\frac{d^i}{d\lambda^i} n = 0,$$

where $i \geq 2$ and $i =$ an integer, $\lambda =$ said preselected wavelength of said beam of electromagnetic radiation and $n =$ index of refraction of said semiconductor material;
   whereby said beam of electromagnetic radiation is output from said system substantially distortion free.

2. A distortion free optical fiber system as defined in claim 1 wherein said compensator means is positioned adjacent said first end of said optical fiber and receives said beam of electromagnetic radiation prior to said beam of electromagnetic radiation entering said first end of said optical fiber whereby said substantially distortion free output beam of electromagnetic radiation emanates from said second end of optical fiber.

3. A distortion free optical fiber system as defined in claim 1 wherein said compensator means is positioned adjacent said second end of said optical fiber and receives said beam of electromagnetic radiation after said beam of electromagnetic radiation passes through said optical fiber whereby said substantially distortion free output beam of electromagnetic radiation emanates from said compensator means after passing through said optical fiber.

4. A distortion free optical fiber system as defined in claim 1 wherein said semiconductor material is matched to said preselected wavelength of said beam of electromagnetic radiation.

5. A distortion free optical fiber system as defined in claim 1 wherein said optical fiber is a single-mode optical fiber.

6. A distortion free optical fiber system as defined in claim 1 wherein said compensator means further comprises means for maintaining said semiconductor material in a temperature controlled environment.

7. A distortion free optical fiber system as defined in claim 6 wherein said semiconductor material maintaining means comprises a housing, means for supporting said semiconductor material within said housing, a pair of oppositely disposed windows in said housing adjacent said semiconductor material, said windows being transparent to said preselected wavelength, and means for passing a coolant through said housing.

8. A distortion free optical fiber system as defined in claim 7 wherein said semiconductor supporting means comprises means for moving said semiconductor material into and out of optical alignment with said beam of electromagnetic radiation.

9. A distortion free optical fiber system as defined in claim 8 further comprising means for comparing said beam of electromagnetic radiation prior to being received by said compensator means with said beam after passing through said compensator means and said optical fiber.

10. A distortion free optical fiber system as defined in claim 9 wherein said comparing means comprising a pair of beam splitters and an autocorrelator.

11. A distortion free optical fiber system as defined in claim 10 wherein said means for providing said beam of electromagnetic radiation comprises a tunable laser.

12. A distortion free optical fiber system as defined in claim 11 wherein said semiconductor material is a GaAs semiconductor crystal.

13. A distortion free optical fiber system as defined in claim 2 wherein said semiconductor material is matched to said preselected wavelength of said beam of electromagnetic radiation.

14. A distortion free optical fiber system as defined in claim 2 wherein said compensator means further comprises means for maintaining said semiconductor material in a temperature controlled environment.

15. A method of providing substantially distortion free transmission of a beam of electromagnetic radiation through an optical fiber, comprising the following steps:

(a) providing compensator means in the form of a semiconductor material having a predetermined excitonic-polariton resonance and a corresponding anamolous dispersion region matched to a preselected wavelength of said beam of electromagnetic radiation such that dispersion through said semiconductor material counterbalances dispersion through said optical fiber and the following criteria is established:

$$\frac{d^i}{d\lambda^i} n = 0$$

where $i \geq 2$ and $i$ equals an integer, $\lambda =$ said wavelength of said beam of electromagnetic radiation, and $n =$ the index of refraction of said semiconductor material;

(b) positioning said semiconductor material in optical alignment with and adjacent either end of said optical fiber; and (c) passing said beam of electromagnetic radiation having said preselected wavelength through both said semiconductor material and said optical fiber.

16. A method of providing substantially distortion free transmission of a beam of electromagnetic radiation through an optical fiber, comprising the following steps:
  (a) providing a compensator means in the form of a semiconductor material having a predetermined excitonic-polariton resonance and a corresponding anamolous dispersion region;
  (b) providing a tunable source for said electromagnetic radiation;
  (c) positioning said semiconductor material in optical alignment with and adjacent either end of said optical fiber;
  (d) tuning said source to said excitonic-polariton resonance and to said anomolous dispersion region of said semiconductor material such that dispersion through said semiconductor material counterbalances dispersion through said optical fiber and the following criteria is established:

$$\frac{d^i}{d\lambda^i} n = 0$$

where $i \geq 2$ and i equals an integer, $\lambda$ = said wavelength of said beam of electromagnetic radiation, and n = the index of refraction of said semiconductor material; and
  (e) passing said beam of electromagnetic radiation having said preselected wavelength through both said semiconductor material and said optical fiber.

17. A method of providing substantially distortion free transmission of a beam of electromagnetic radiation through an optical fiber as defined in claim 15 further comprising the step of maintaining said semiconductor material in a temperature controlled environment during the transmission of said beam of electromagnetic radiation therethrough.

18. A method of providing substantially distortion free transmission of a beam of electromagnetic radiation through an optical fiber as defined in claim 16 further comprising the step of maintaining said semiconductor material in a temperature controlled environment during the transmission of said beam of electromagnetic radiation therethrough.

* * * * *